(12) United States Patent
Shimojo (10) Patent No.: US 7,819,523 B2
(45) Date of Patent: Oct. 26, 2010

(54) OCULAR LENS

(75) Inventor: Akira Shimojo, Honjo (JP)

(73) Assignee: Hoya Healthcare Corporation, Tokyo (JP)

( * ) Notice: Subject to any disclaimer, the term of this patent is extended or adjusted under 35 U.S.C. 154(b) by 434 days.

(21) Appl. No.: 11/921,447

(22) PCT Filed: May 31, 2006

(86) PCT No.: PCT/JP2006/310872

§ 371 (c)(1),
(2), (4) Date: Dec. 3, 2007

(87) PCT Pub. No.: WO2006/129707

PCT Pub. Date: Dec. 7, 2006

(65) Prior Publication Data

US 2009/0303433 A1     Dec. 10, 2009

(30) Foreign Application Priority Data

Jun. 3, 2005     (JP) ............................. 2005-164164

(51) Int. Cl.
*G02C 7/04* (2006.01)

(52) U.S. Cl. ...................... 351/161; 351/164; 351/169; 351/168

(58) Field of Classification Search ................. 351/161
See application file for complete search history.

(56) References Cited

U.S. PATENT DOCUMENTS

| 4,580,882 | A | 4/1986 | Nuchman et al. |
|---|---|---|---|
| 4,580,883 | A | 4/1986 | Shinohara |
| 4,693,572 | A | 9/1987 | Tsuetaki et al. |
| 5,760,870 | A | 6/1998 | Payor et al. |
| 6,019,470 | A | 2/2000 | Mukaiyama et al. |
| 2003/0123025 | A1* | 7/2003 | Shirayanagi ................ 351/168 |
| 2004/0257527 | A1* | 12/2004 | Qi et al. ...................... 351/177 |
| 2005/0099595 | A1 | 5/2005 | Lindacher |

FOREIGN PATENT DOCUMENTS

| CN | 1164037 A | 11/1997 |
|---|---|---|
| CN | 1432139 A | 7/2003 |
| DE | 24 62 446 A1 | 3/1977 |
| EP | 0 248 489 A2 | 12/1987 |
| GB | 1025677 | 4/1966 |
| JP | A 57-94714 | 6/1982 |
| JP | A 59-208524 | 11/1984 |
| JP | A 2002-131705 | 5/2002 |
| WO | WO 01/75509 A1 | 10/2001 |
| WO | WO 2004/092805 A1 | 10/2004 |

OTHER PUBLICATIONS

Translation of Apr. 1, 2010 Office Action issued in Chinese Patent Application No. 200680019554.X.

* cited by examiner

*Primary Examiner*—Jessica T Stultz
(74) *Attorney, Agent, or Firm*—Oliff & Berridge, PLC

(57) ABSTRACT

To provide an ocular lens capable of securing a stable image in a distance portion and a near portion, and suppressing a generation of blurring or ghosting of the image. A progressive multifocal far and near contact lens is provided, having a distance portion for aiding a far vision, a near portion for aiding a near vision, and an intermediate portion in which power is progressively changed between the distance portion and the near portion, and a power distribution of a lens optical region along a direction of a vertical axis N of the lens optical region is set according to a predetermined function.

8 Claims, 6 Drawing Sheets

PRIOR ART

OCULAR LENS

TECHNICAL FIELD

The present invention relates to an ocular lens, and particularly relates to an ocular lens suitable for use as a progressive multifocal far and near contact lens.

BACKGROUND ART

Figure 12:
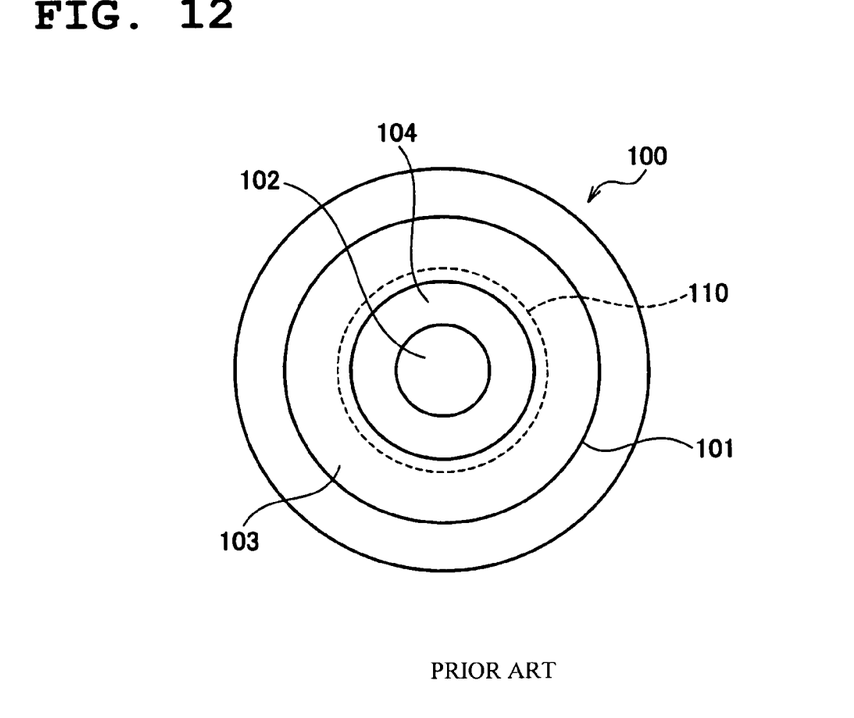
FIG. 12 is a front view of a conventional simultaneous perception type far and near contact lens showing a concentric circular power distribution.

A simultaneous perception type far and near contact lens 100 is known, in which a distance portion 102 for aiding far vision is disposed in the center portion of a lens optical region 101, a near portion 103 for aiding near vision is disposed in the peripheral part of the lens optical region 101, and an intermediate portion 104, in which a power gradually changes, is disposed between the distance portion 102 and the near portion 103 in the far and near contact lens, as shown in FIG. 12, and the power in the lens optical region 101 is distributed in a concentric circle (Patent Document 1).

A bifocal alternating-vision contact lens is known, in which a distance portion is provided in the upper part of the lens optical region, and a near portion is provided in the lower part in the far and near contact lens, as described in Patent Document 2. A trifocal alternating-vision contact lens is also known in which a distance portion is provided in the upper part of the lens optical region, a near portion is provided in the lower part, and an intermediate portion is provided between the distance portion and the near portion in the far and near contact lens, as described in Patent Document 3.

[Patent Document 1]
JP-A 59-208524
[Patent Document 2]
U.S. Pat. No. 4,693,572 Specification
[Patent Document 3]
UK Patent No. 1025677 Specification

DISCLOSURE OF THE INVENTION

Problem to be Solved by the Invention

A power distribution is in an appearance of a concentric circle as shown in FIG. 12 in the far and near contact lens 100 described in Patent Document 1, and the far and near contact lens 100 therefore has no directionality, and is configured so as to function without hindrance even when the contact lens 100 rotates on the cornea of the eye, for example. However, in such a far and near contact lens 100, since the near portion 103 or the intermediate portion 104 of the contact lens 100 is positioned at the upper part of a pupil 110 of the eye during far vision, the light entering the pupil 110 through the near portion 103 or the intermediate portion 104 (particularly the near portion 103) may cause blurring or ghosting of the image, a clear image can not be obtained, and there is a risk of lowering contrast.

In the bifocal or trifocal far and near contact lens described in Patent Documents 2 and 3, the power distribution is not specifically described, and the power distribution is roughly described. Therefore, wavering or jumping of the image easily occurs due to the change of power among the distance portion, the intermediate portion, and the near portion, and image blurring or ghosting easily occurs due to the inability to adapt to changes in the visual line, or movement of the contact lens. As a result, there is a problem that a clear image also can not be obtained in the far and near contact lens described in Patent Documents 2 and 3.

In view of the above-described circumstances, the present invention is provided, and an object of the present invention is to provide an ocular lens capable of securing a stable image in the distance portion and the near portion and capable of obtaining a clear image by suppressing blurring, ghosting, and the like of the image.

Means for Solving these Problems

A first aspect of the present invention provides a progressive multifocal ocular lens having a distance portion for aiding far vision, an intermediate portion for aiding intermediate vision, and a near portion for aiding near vision in a lens optical region, wherein the distance portion, the intermediate portion, and the near portion are sequentially arranged from an upper end to a lower end of an optical part from one end to the other end along a prescribed direction of the lens optical region, and power in these regions changes continuously.

In a second aspect of the present invention according to the first aspect, a power distribution of the lens optical region is set in accordance with the following formula (1):

[Formula 1]

$$PowerDist = P\text{-Power} + \left(\frac{\text{Max-Add}}{\pi}\right) \left\{ \frac{\tan^{-1}\left(\frac{\text{Wave}}{Bnf}X - \text{Wave}\right) +}{\tan^{-1}(\text{Wave})} \right\} \quad (1)$$

wherein each symbol in the formula (1) is defined as follows:

PowerDist: power distribution (unit: D (diopter));

P-Power: power (unit: D) at one end point of the lens optical region;

Max-Add: power difference (unit: D) between one end point and the other end point of the lens optical region;

Bnf: distance (unit: mm) from one end point of the lens optical region to a boundary between a distance power of the distance portion and a near power of the near portion;

Wave: power variation coefficient (wave degree); and x: distance (unit: mm) from one end point of the lens optical region.

In a third aspect of the present invention according to the second aspect, ranges of values of the P-Power, the Max-Add, the Bnf, and the Wave are as follows:

−25D≦P-Power≦+25D;

±0D≦Max-Add≦+8D;

0.5 mm≦Bnf≦7 mm; and

1≦Wave≦8.

In a fourth aspect of the present invention according to the first, second, or third aspect, the power distribution of the lens optical region is set by changing a radius of curvature of at least one of a front surface and a back surface of the lens optical region in a range from the distance portion to the near portion through the intermediate portion.

In a fifth aspect of the present invention according to any of the first through fourth aspects, the prescribed direction is a vertical direction of an eye during wearing the ocular lens.

In a sixth aspect of the present invention according to any of the first through fourth aspects, the prescribed direction is set so as to tilt towards the nose of the face from the vertical direction of the eye during wearing the ocular lens.

In a seventh aspect of the present invention according to any of the first through sixth aspects, the ocular lens is a contact lens having a rotation preventing mechanism at an end part in the prescribed direction, for preventing the lens from rotating.

In an eighth aspect of the present invention according to the seventh aspect, the rotation preventing mechanism is a prism ballast provided at the other end in the prescribed direction of the contact lens.

In a ninth aspect of the present invention according to the seventh aspect, the rotation preventing mechanism is a slab-off provided at one end part or both end parts in the prescribed direction of the contact lens.

In a tenth aspect of the present invention according to any of the first through ninth aspects, a power distribution in accordance with formula (1) is set in the prescribed direction of the lens optical region in at least one of the front surface and the back surface of the lens optical region, and an astigmatism degree is set in a direction orthogonal to the prescribed direction.

In an eleventh aspect of the present invention according to any of the first through ninth aspects, a power distribution in accordance with the formula (1) is set in the prescribed direction of the lens optical region in at least one of the front surface and the back surface of the lens optical region, and the other of the front surface and back surface is formed to be a toric surface having an astigmatism correcting function.

In a twelfth aspect of the present invention according to the eleventh aspect, the ocular lens is a contact lens in which the back surface of the lens optical region is fitted on a cornea of an eye, and the back surface is formed to be a toric surface that is formed according to a shape of a cornea in an astigmatic state.

ADVANTAGE OF THE INVENTION

According to the first aspect of the present invention, since all of the upper part of the lens is the distance portion, clearer far vision is possible than in a lens with the power distribution formed in a concentric circle, and image jumping or ghosting can be prevented by continuously changing the power of the lens.

According to the second aspect of the present invention, the power of an entire surface of the lens optical surface can be continuously changed without the occurrence of a mathematically non-continuous point, which aids in enhancing image quality and preventing image jumping.

According to the second, third, fourth, or fifth aspect of the present invention, since the diopter distribution in the prescribed direction of the lens optical region in the ocular lens is set in accordance with the formula (1), the power distribution in the lens optical region of the ocular lens can be specifically adapted to the ocular prescription of the ocular lens wearer. Consequently, power fluctuation in the distance portion and the near portion of the ocular lens can be minimized, and a stable image can therefore be maintained between the distance portion and the near portion.

Since the power distribution along the prescribed direction of the lens optical region in the ocular lens is set in accordance with the formula (1), a fine power change corresponding to a movement of the ocular lens or the change of the visual line moving among the distance portion, the intermediate portion, and the near portion of the ocular lens, can be provided in the lens optical region. Image blurring and ghosting can therefore be suppressed to a minimum, lowering of contrast of the image can be prevented, and wavering or jumping of the image due to excessive power variation can be suppressed. As a result, a clear image can be secured.

According to the sixth aspect of the present invention, the prescribed direction of the lens optical region is set so as to be tilted towards the nose side of the face from the vertical direction of the eye during wearing the ocular lens. Since the distance portion, the intermediate portion, and the near portion are therefore arranged in the lens optical region so as to be tilted towards the nose side of the face in the lens optical region, thereby excellently responding to the characteristics of an eye that converges in the near vision.

According to the seventh, eighth, or ninth aspect of the present invention, since the ocular lens is a contact lens provided with a rotation preventing mechanism at an end portion side along the prescribed direction, rotation of the contact lens fitted on the cornea of the eye can be prevented or suppressed by the rotation preventing mechanism. Accordingly, a clear image can always be stably obtained in the distance portion and the near portion of the contact lens.

According to the tenth aspect of the present invention, the power distribution in accordance with the formula (1) is set along the prescribed direction of the lens optical region on at least one of the front surface and the back surface of the lens optical region, and the astigmatism degree is set in the direction orthogonal to the prescribed direction. The ocular lens can therefore be realized that is provided with a function of aiding the far vision and the near vision, as well as a function of correcting astigmatism.

According to the eleventh aspect of the present invention, the power distribution in accordance with the formula (1) is set along the prescribed direction of the lens optical region on at least one of the front surface and the back surface of the lens optical region, and the other one of the front surface and back surface is formed in a toric surface having an astigmatism correcting function. The toric surface can therefore perform the astigmatism correcting function independently of the diopter distribution that follows the formula (1). Accordingly, the toric surface can exhibit correcting function to almost all astigmatism, including inverted astigmatism, straight astigmatism, and oblique astigmatism, and the like.

According to the twelfth aspect of the present invention, the ocular lens is a contact lens, with the back surface of the lens optical region fitted on the cornea of the eye, and the back surface is a toric surface formed corresponding to the shape of the cornea in the astigmatic state. Therefore, the astigmatism correcting function can be exhibited and also the rotation preventing function of the ocular lens (contact lens) can be exhibited by fitting the back surface on the cornea of the eye. When the end portion side along the prescribed direction of the lens optical region in the ocular lens has the rotation preventing mechanism, prevention of the rotation of the ocular lens (contact lens) can be even more effectively realized.

BEST MODE FOR CARRYING OUT THE INVENTION

[A] Embodiment 1

A best mode for carrying out the invention will be described hereinafter based on the drawings.

Figure 1:
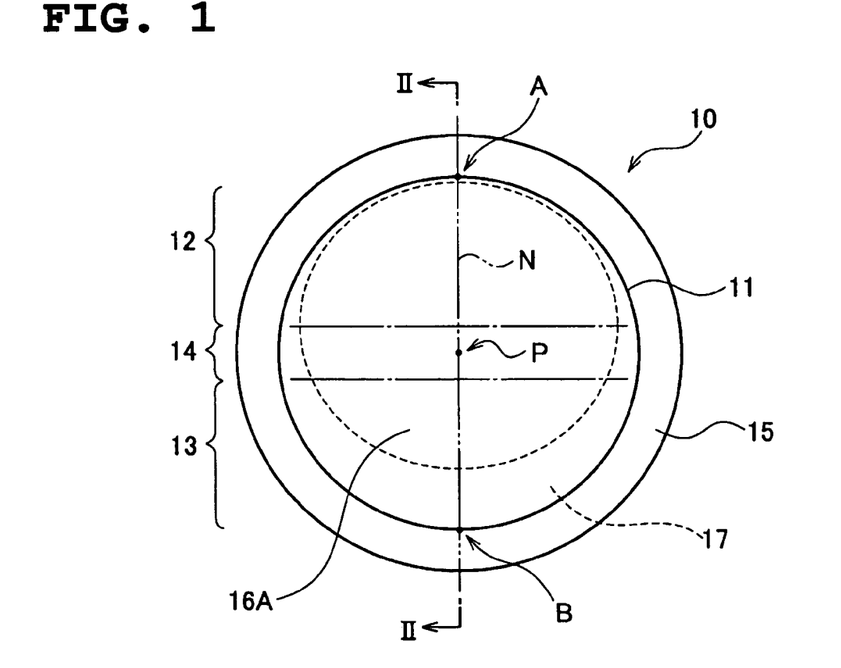
FIG. 1 is a front view showing a far and near contact lens according to an embodiment 1 of an ocular lens of the present invention.
Figure 2:
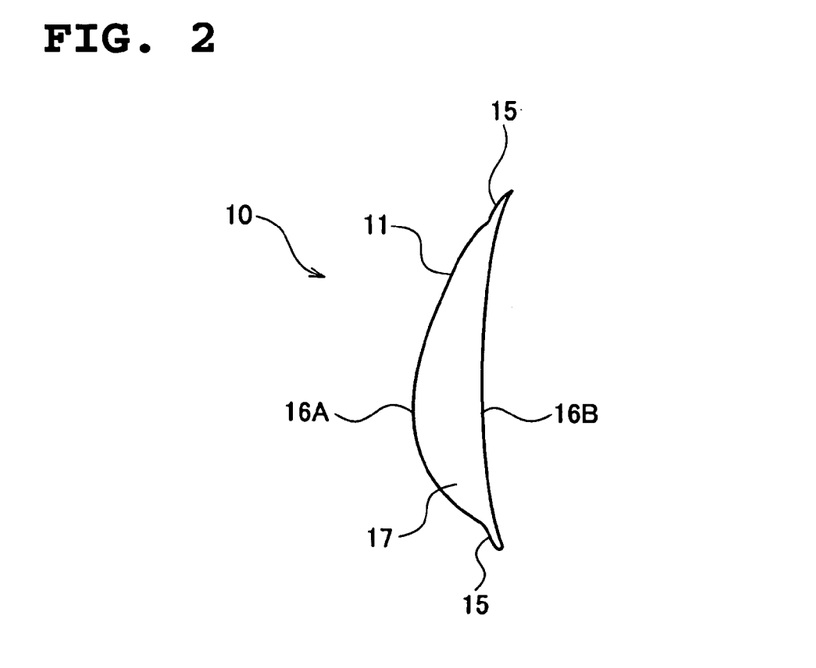
FIG. 2 is a sectional view taken along the line II-II of FIG. 1.
Figure 5:
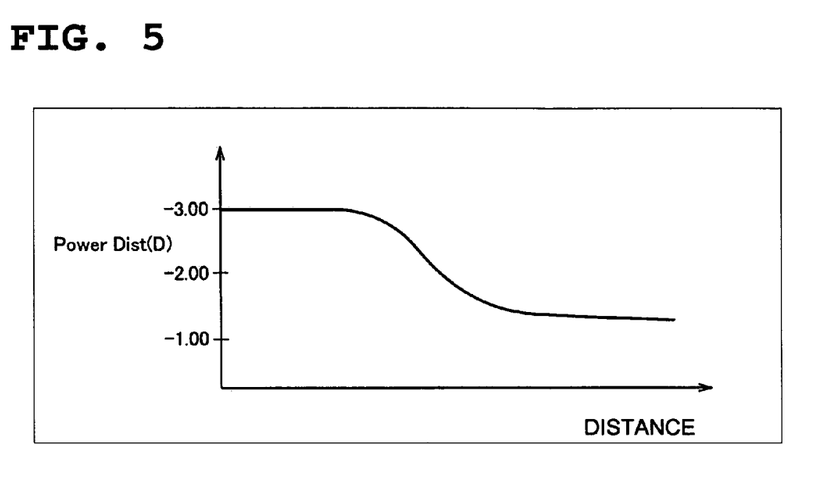
FIG. 5 is a graph showing a power distribution (when a distance portion shows a minus power) in the lens optical region of FIG. 3.
Figure 6:
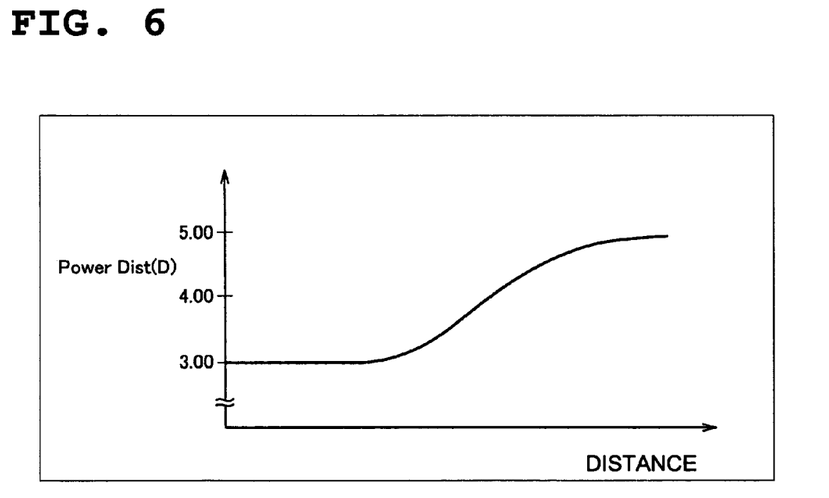
FIG. 6 is a graph showing the power distribution (when the distance portion shows a plus power) in the lens optical region of FIG. 3.

FIG. 1 is a front view showing a far and near contact lens according to Embodiment 1 of the ocular lens of the present invention. FIG. 2 is a sectional view taken along the line II-II in FIG. 1. FIG. 5 is a graph showing a power distribution (when the distance portion shows a minus power) in the lens optical region of FIG. 3. FIG. 6 is a graph showing the power distribution (when the distance portion shows a plus power) in the lens optical region of FIG. 3.

The far and near contact lens 10 shown in FIG. 1 is the ocular lens applied to an eye such as a presbyopic eye that deteriorates in a sight adjustment capability, for aiding the sight adjustment capability, and is a progressive multifocal contact lens in which a plurality of powers are progressively arranged within a lens optical region 11 in the center portion. Namely, the lens optical region 11 of the far and near contact lens 10 is provided with a distance portion 12 having a far vision power for aiding in the far vision, a near portion 13 having a near vision power for aiding in the near vision, and an intermediate portion 14 in which the power progressively changes between the distance portion 12 and the near portion 13. A flange part 15 for placing the far and near contact lens 10 on the cornea 2 (see also FIGS. 9A and 9B) of an eye 1 is provided on the periphery of the lens optical region 11 in the far and near contact lens 10.

Figure 9A:
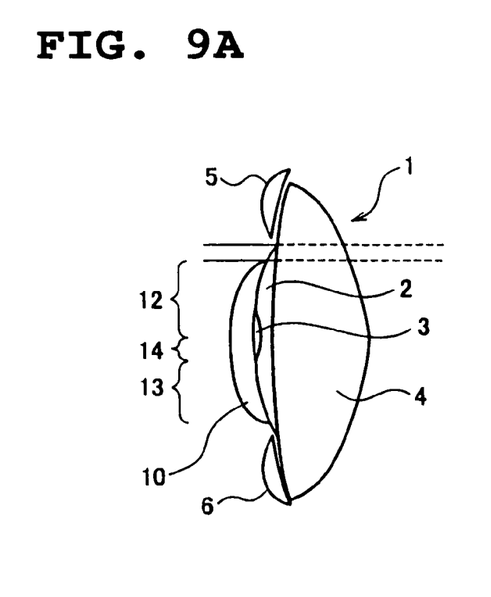
FIG. 9A is a side view showing a use state of a far and near contact lens of FIG. 1 in viewing far, together with an eyeball.
Figure 9B:
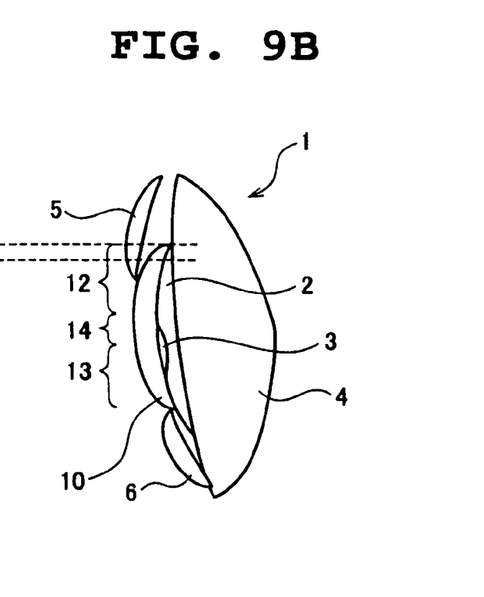
FIG. 9B is a side view showing the use state of the far and near contact lens of FIG. 1 in viewing near, together with the eyeball.

The reference numeral 3 in FIGS. 9A and 9B indicates a pupil for taking in light, 4 indicates the sclera, 5 indicates the upper eyelid, and 6 indicates the lower eyelid.

Figure 3A:
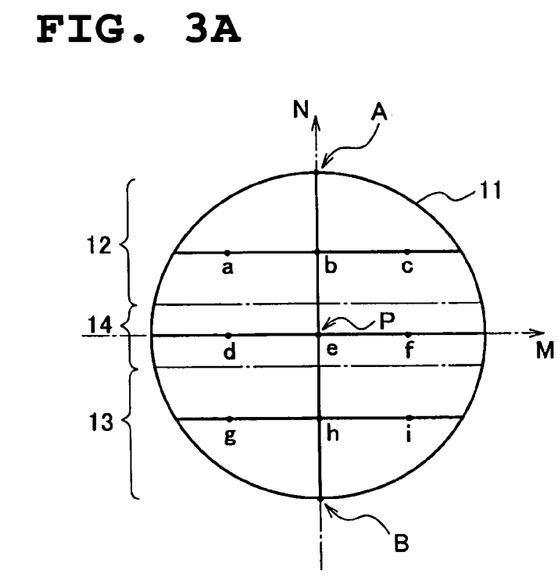
FIG. 3 shows a lens optical region of the far and near contact lens of FIG. 1, wherein (A) is a front view and (B) is a side view.
Figure 3B:
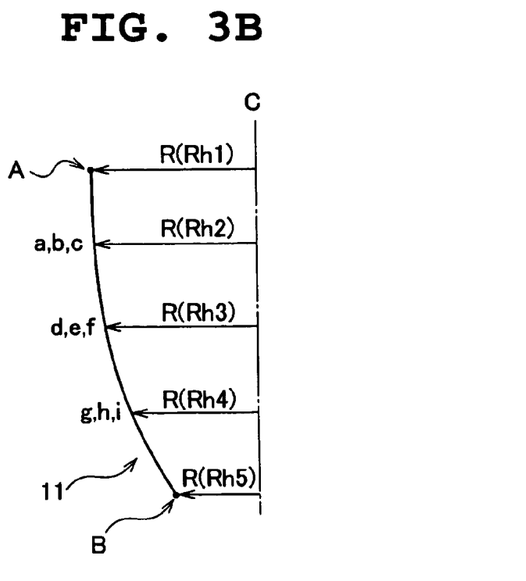

As shown in FIGS. 1 and 3, the distance portion 12, the intermediate portion 14, and the near portion 13 are sequentially arranged in the prescribed direction of the lens optical region 11, i.e., from an upper end point A as one end of the lens optical region 11 to a lower end point B as the other end of the lens optical region 11 along the direction of the vertical axis N of the lens optical region 11. The direction of the vertical axis N of the lens optical region 11 is the direction that coincides with the vertical direction (upper and lower direction) of the eye 1 when the far and near contact lens 10 is fitted on the eye 1. At this time, the power distribution of the lens optical region 11 changes right and left symmetrically along the direction of the vertical axis N of the lens optical region 11, i.e., the power is the same along the direction of the lateral axis M orthogonal to the vertical axis N. However, the power is set so as to increase from the distance portion 12 to the near portion 13 through the intermediate portion 14 arranged along the direction of the vertical axis N. Here, the vertical axis N of the lens optical region 11 is a straight line passing through the center P of the lens optical region 11 from the upper end point A to the lower end point B.

Specifically, the power distribution along the direction of the vertical axis N in the lens optical region 11 is set in accordance with the following formula (1).

[Formula 2]

$$PowerDist = P\text{-}Power + \left(\frac{Max\text{-}Add}{\pi}\right)\left\{\tan^{-1}\left(\frac{Wave}{Bnf}X - Wave\right) + \tan^{-1}(Wave)\right\} \quad (1)$$

wherein each symbol in the formula (1) is defined as follows:

PowerDist: power distribution (unit: D (diopter));

P-Power: power (units: D) at the upper end point A of the lens optical region 11;

Max-Add: power difference (unit: D) between the upper end point A and the lower end point B of the lens optical region 11;

Bnf: distance (unit: mm) from the upper end point A of the lens optical region 11 to a boundary between a distance vision power of the distance portion 12 and a near vision power of the near portion 13;

Wave: power variation coefficient (wave degree); and x: distance (unit: mm) from the upper end point A of the lens optical region 11.

Here, a range of values of the P-Power, the Max-Add, the Bnf, and the Wave are as follows:

−25D≦P-Power≦+25D;

±0D≦Max-Add≦+8D;

0.5 mm≦Bnf≦7 mm; and

1≦Wave≦8.

The power distribution along the direction of the vertical axis N of the lens optical region 11 set by the formula (1) is shown in FIGS. 5 and 6. In FIGS. 5 and 6, the vertical axis indicates the power (D), and the horizontal axis indicates the distance X (mm) from the upper end point A of the lens optical region 11. FIG. 5 shows the case of a far and near contact lens 10 used for myopia in which the distance portion 12 shows a minus power, and FIG. 6 shows the case of a far and near contact lens 10 used for hyperopia in which the distance portion 12 shows a plus power.

The power distribution of the lens optical region 11 of the far and near contact lens 10 is set from the prescription of the eye of the wearer of the far and near contact lens 10 by obtaining necessary far vision correcting power and near vision correcting power, defining P-Power, Max-Add, Bnf, and Wave from these correcting powers and the like, and substituting the values thus obtained into the formula (1). The power distribution along the direction of the vertical axis N in the lens optical region 11 of the far and near contact lens 10 is thus set according to formula (1), whereby a specific power distribution adapted to the prescription of the eye of a lens wearer can be realized, and a fine power variation in accordance with the movement of the far and near contact lens 10 or variation of the visual line moving among the distance portion 12, the intermediate portion 14, and the near portion 13 of the lens optical region 11, can be provided in the lens optical region 11 (particularly the boundary regions of the distance portion 12, the intermediate portion 14, and the near portion 13).

The power distribution of the lens optical region 11 thus set is obtained by changing, i.e., sequentially shortening, the curvature radius R of at least one of the convex surface 16A (FIG. 2) as the surface of the lens optical region 11 and the concave surface 16B (FIG. 2) as the back surface in the range from the distance portion 12 to the near portion 13 through the intermediate portion 14. Generally, the concave surface 16B of the lens optical region 11 in a contact lens is formed in a spherical surface or an aspherical surface according to the shape of the cornea 2 of the lens wearer's eye 1, and the change of the abovementioned curvature radius R is therefore achieved with respect to the convex surface 16 of the lens optical region 11.

Figure 4:
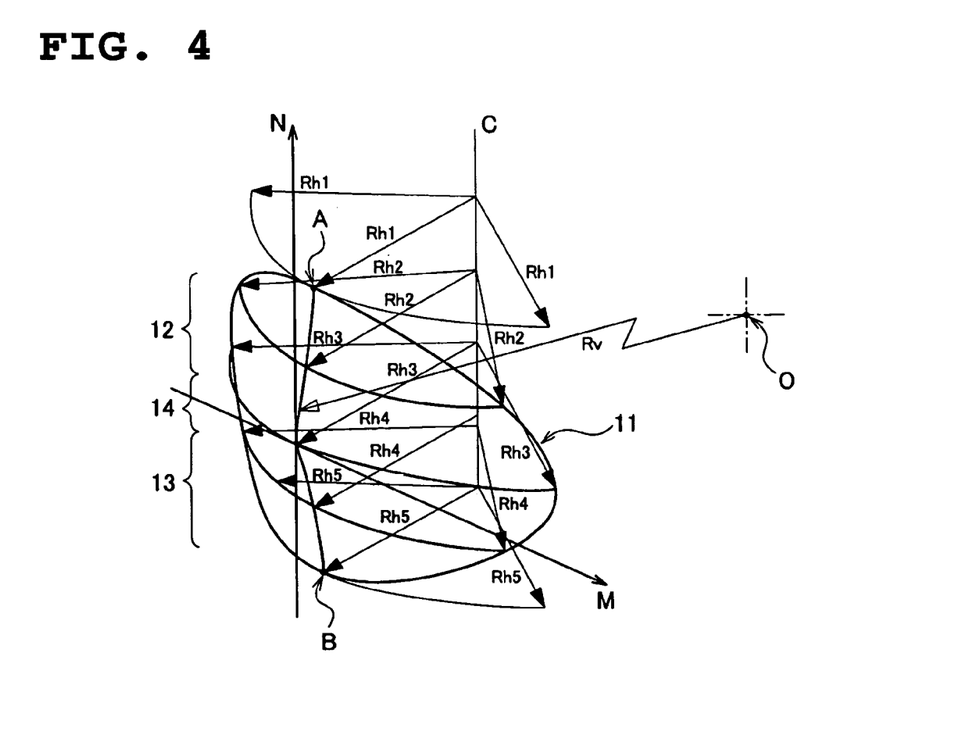
FIG. 4 is a perspective view showing a shape of the lens optical region shown of FIG. 3.

The change of the curvature radius R of the convex surface 16 of the lens optical region 11 is achieved as shown in FIGS. 3 and 4, so that the curvature radius R from a rotational axis C parallel to the vertical axis N of the lens optical region 11 is the same in the lateral direction M, maximum at the upper end point A along the direction of the vertical axis N (R=Rh1), sequentially reduced toward the distance portion 12, the intermediate portion 14, and the near portion 13 (R=Rh2, Rh3, Rh4), and minimum at the lower end point B (R=Rh5). More specifically, in the lens optical region 11, the curvature radius R is set to the curvature radius Rh1 at the upper end point A, the same curvature radius Rh2 at point a, point b, and point c on the same lateral axis M, the same curvature radius Rh3 at point d, point e, and point f on the other same lateral axis M, the same curvature radius Rh4 at point g, point h, and point i on the other same lateral axis M, and the curvature radius Rh5 at the lower end point B.

Also, as shown in FIG. 1, in the far and near contact lens 10, a prism ballast 17 as a rotation preventing mechanism is formed on the side of the lower end point B along the direction of the vertical axis N of the lens optical region 11. As shown in FIG. 2, the prism ballast 17 is configured so that the portion on the side of the lower end point B of the lens optical region 11 is formed thick to function as a weight that prevents or suppresses rotation of the far and near contact lens 10 that is fitted on the cornea 2 of the eye 1, and always keeps the lower end point B of the lens optical region 11 positioned at a lower position. The presence of the prism ballast 17 ensures that the far and near contact lens 10 fitted on the cornea 2 of the eye 1 is always stably positioned with the distance portion 12 of the lens optical region 11 on the upper part of the eye 1, and the near portion 13 on the lower part of the eye 1.

Figure 7:
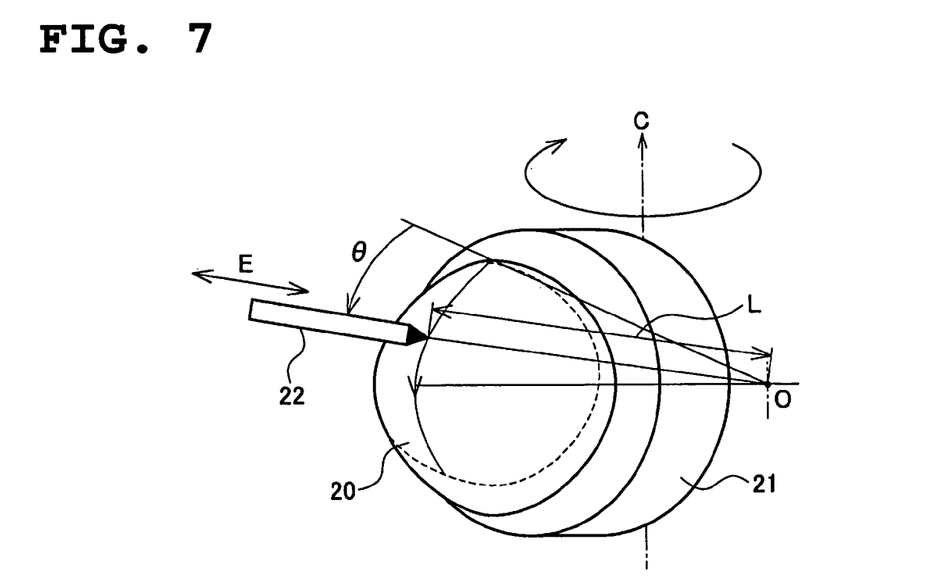
FIG. 7 is a perspective view showing a manufacturing process of the far and near contact lens of FIG. 1.
Figure 8:
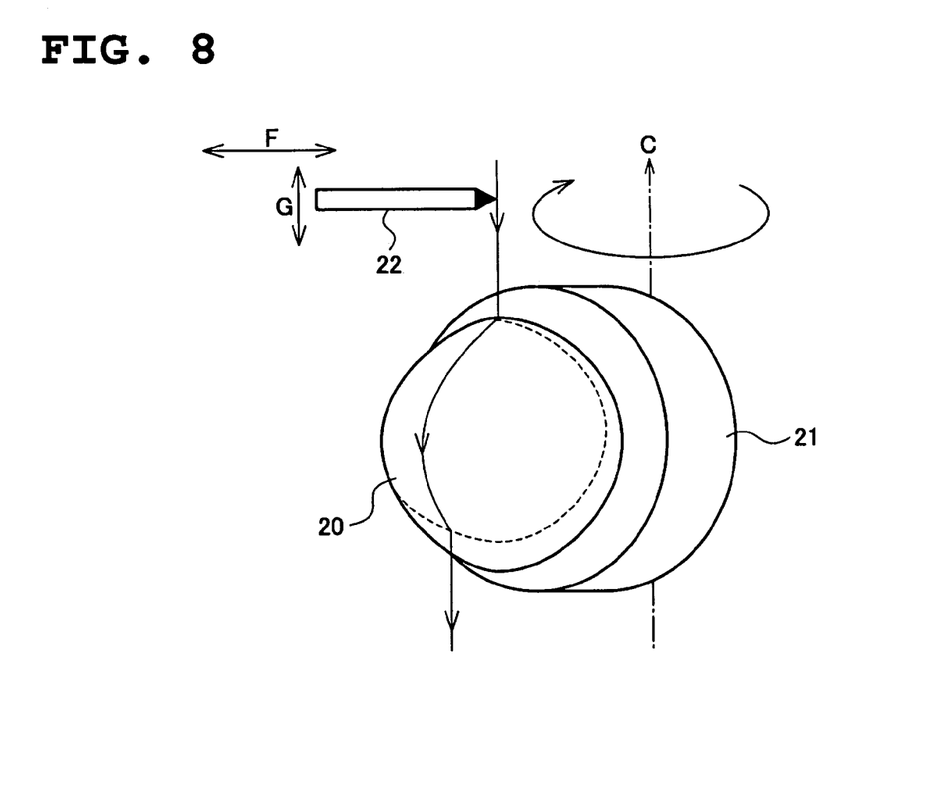
FIG. 8 is a perspective view showing other manufacturing process of the far and near contact lens of FIG. 1.

FIGS. 7 and 8 will be used to describe the manufacturing process for the far and near contact lens 10 whereby the aforementioned curvature radius R is formed in the convex surface 16A of the lens optical region 11, and the prism ballast 17 is formed on the side of the lower end point B of the lens optical region 11.

In one manufacturing process, as shown in FIG. 7, a contact lens material 20 to be processed into a far and near contact lens 10 is held in a lens holder 21 and rotated around the rotation axis C, and while a cutting tool 22 is turned around an original point O, this cutting tool 22 approaches or turns against the direction of E with respect to the original point O, thereby changing a distance L between the cutting tool 22 and the original point O. Along with an increase of a rotation angle θ of the cutting tool 22 that turns from the position corresponding to the upper end point A of the near and far contact lens 10, the cutting tool 22 is approached to the original point O. Whereby, the convex surface 16A having the aforementioned curvature radius R is formed in the lens optical region 11, the prism ballast 17 is processed, and the far and near contact lens 10 is manufactured.

As shown in FIG. 8, in another manufacturing process, by moving the cutting tool 22 in a direction of G that coincides with the direction of the vertical axis N of the lens optical region 11, and in a direction F orthogonal to the direction of G, the convex surface 16A having the curvature radius R is formed in the lens optical region 11, the prism ballast 17 is processed, and the far and near contact lens 10 is manufactured, while the contact lens material 20 is held in the lens holder 21 and rotated around the rotation axis C.

As shown in FIGS. 9A and 9B, when the far and near contact lens 10 manufactured as described above is fitted on the cornea 2 of the eye 1, since the prism ballast 17 is provided in the far and near contact lens 10, the distance portion 12 of the lens optical region 11 is stably positioned on the upper part of the eye 1, and the near portion 13 is stably positioned on the lower part of the eye 1. Since most of the pupil 3 of the eye 1 therefore corresponds to the distance portion 12 of the far and near contact lens 10 in far vision, the pupil 3 can take in more light from the distance portion 12 of the far and near contact lens 10, and a clear far vision image can be obtained by the distance portion 12. In downward vision, being the near vision, since the lower eyelid 6 pushes-up the far and near contact lens 10 upward, a major part of the pupil 3 of the eye 1 corresponds to the near portion 13 of the far and near contact lens 10, the pupil 3 takes in more light from the near portion 13 of the far and near contact lens 10, and a clear near-visual image can be obtained by the near portion 13.

With the aforementioned structure, the following advantages (1) through (4) are exhibited according to the aforementioned embodiment.

(1) Since the power distribution along the direction of the vertical axis N of the lens optical region 11 in the far and near contact lens 10 is set in accordance with the formula (1), the power distribution in the lens optical region 11 of the far and near contact lens 10 can be set as a specific power distribution adapted to the prescription of the eye 1 of the lens wearer. Accordingly, the power fluctuation in the distance portion 12 and the near portion 13 of the far and near contact lens 10 can be minimized, and a stable image (far vision image, near-vision image) can therefore be secured between the distance portion 12 and the near portion 13.

(2) Since the power distribution along the direction of the vertical axis N of the lens optical region 11 in the far and near contact lens 10 is set in accordance with the formula (1), A fine power variation corresponding to the movement of the far and near contact lens 10 or change of the visual line moving among the distance portion 12, the intermediate portion 14, and the near portion 13 of the far and near contact lens 10 can be provided in the lens optical region 11 (particularly the boundaries of the distance portion 12, the intermediate portion 14, and the near portion 13). Image blurring and ghosting can therefore be kept to a minimum, lowering of the contrast of the image can be prevented, and wavering or jumping of the image due to excessive power variation can be suppressed. As a result, a clear image can be maintained.

(3) The distance portion 12, the intermediate portion 14, and the near portion 13 are arranged sequentially from the upper end point A to the lower end point B along the direction of the vertical axis N in the lens optical region 11 of the far and near contact lens 10. The distance portion 12 can therefore be set in a wide range in the necessary location (upper side portion of the lens optical region 11) for far vision, and the near portion 13 can be set in a wide range in the necessary location (lower side portion of the lens optical region 11) for near vision. As a result, the far and near contact lens 10 having an excellent sight aiding efficiency can be obtained.

(4) Since the far and near contact lens 10 is provided with the prism ballast 17 as a rotation preventing mechanism on the side of the lower end point B along the direction of the vertical axis N of the lens optical region 11, rotation of the far and near contact lens 10 fitted on the cornea 2 of the eye 1 can be prevented or suppressed by the prism ballast 17. Accordingly, a clear far vision image and a clear near-vision image can be stably obtained through the distance portion 12 and the near portion 13, respectively, of the far and near contact lens 10.

Figure 10:
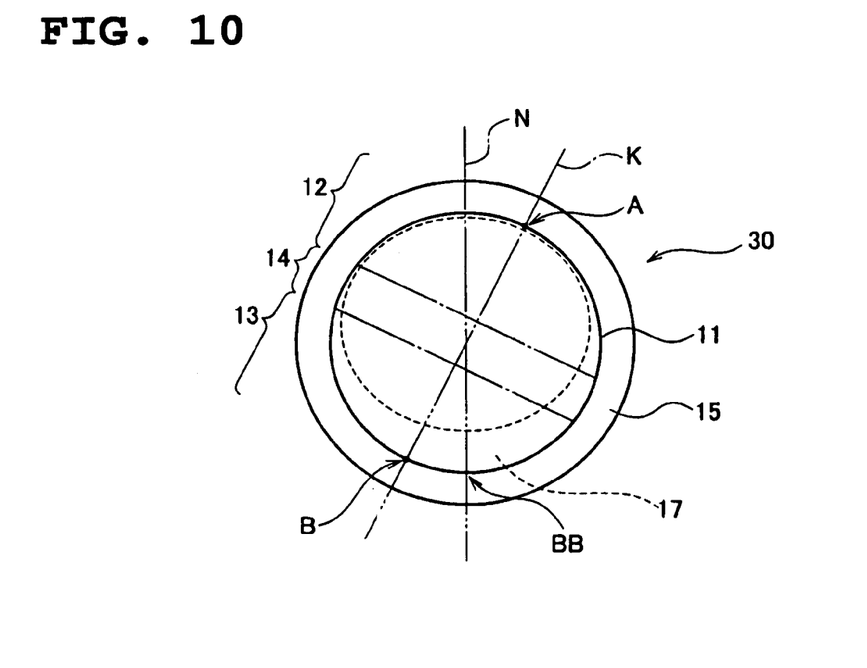
FIG. 10 is a front view showing a modified example of the far and near contact lens of FIG. 1.

FIG. 10 is a front view showing a modified example of the far and near contact lens shown in FIG. 1. In this modified example, the same reference symbols are used to indicate components that are the same as those of the far and near contact lens 10 according to Embodiment 1, and description thereof is omitted.

In the far and near contact lens 30 in this modified example, the prescribed direction of the lens optical region 11 in which the distance portion 12, the intermediate portion 14, and the near portion 13 are sequentially arranged is the direction of a tilted axis K that is tilted towards the nose of the face from the direction of the vertical axis N of the lens optical region 11, which coincides with the vertical direction (upper and lower direction) of the eye 1. Accordingly, the upper end point A and the lower end point B of the lens optical region 11 are set on the tilted axis K. The prism ballast 17 is also provided on the side of the lower end point BB on the vertical axis N in the lens optical region 11.

The distance portion 12, the intermediate portion 14, and the near portion 13 are thus sequentially arranged along the tilted axis K that is tilted towards the nose from the vertical axis N of the lens optical region 11, so as to excellently respond to the characteristic of the eye that converges in the near vision. Namely, since a further larger portion of the pupil 3 of the eye 1 corresponds to the near portion 13 of the far and near contact lens 10 in the near vision, the pupil 3 can take in even more light that passes through the near portion 13 of the far and near contact lens 10, and a clear near-vision image can be ensured. In addition, in this modified example also, the same advantages as the advantages of (1) to (4) of the aforementioned embodiments can be exhibited.

Figure 11:
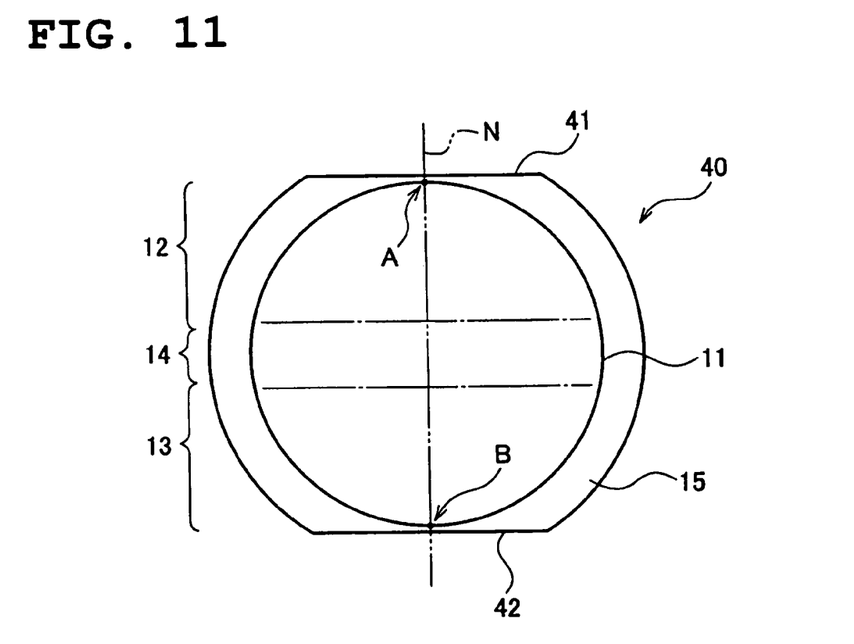
FIG. 11 is a front view showing other modified example of the far and near contact lens of FIG. 1.

FIG. 11 is a front view showing another modified example of the far and near contact lens shown in FIG. 1. In this modified example, the same reference symbols are used to indicate components that are the same as those of the far and near contact lens 10 in Embodiment 1, and description thereof is omitted.

In the far and near contact lens 40 according to another modified example, the rotation preventing mechanism in the far and near contact lens 10 of the first embodiment is differentiated, and instead of using the prism ballast 17, slab-off parts 41 and 42 are formed, with both end parts in the flange part 15 along the direction of the vertical axis N cut away. When the far and near contact lens 40 is fitted on the cornea 2 of the eye 1, the slab-off parts 41, 42 are retained by the upper eyelid 5 and the lower eyelid 6, respectively, whereby the far and near contact lens 40 is prevented from rotating. The slab-off parts 41, 42 may also be formed in the end part of only one side of the flange part 15 in the far and near contact lens 40. Accordingly, in this modified example also, the same advantages of the advantages of (1) to (4) of the far and near contact lens 10 of the first embodiment can be exhibited.

[B] Embodiment 2

In the far and near contact lens 10 according to Embodiment 2, the power distribution in accordance with the formula (1) is set along the direction of the vertical axis N of the lens optical region 11 in at least one (usually the convex surface 16A) of the convex surface 16A and the concave surface 16B of the lens optical region 11 in the same manner as embodiment 1, and the astigmatism degree is also set in the same convex surface 16A or concave surface 16B (usually the convex surface 16A) as that on which this power distribution is set. The astigmatism degree is set along the direction of the lateral axis M orthogonal to the direction of the vertical axis N in which the power distribution according to the formula (1) is set.

Therefore, according to the far and near contact lens 10 of the embodiment 2, the function of aiding the far vision and the near vision by the distance portion 12 and the near portion 13 can be exhibited based on the power distribution set according to the formula (1), and in addition, the function of correcting the astigmatism (particularly such as inverted astigmatism and straight astigmatism) can be exhibited.

[C] Embodiment 3

In the far and near contact lens 10 according to an embodiment 3, the power distribution according to the formula (1) is set along the direction of the vertical axis N of the lens optical region 11 in at least one of the convex surface 16A and the concave surface 16B of the lens optical region 11 (usually the convex surface 16A), and the other one of the convex surface 16A and the concave surface 16B (usually the concave surface 16B) is formed to be the toric surface having the astigmatism correcting function. The toric surface is formed so as to correspond to the shape of the cornea 2 in an astigmatic state in the eye 1 of the lens wearer.

Since the cornea 2 in the astigmatic state has different curvature radius of two orthogonal axes, the toric surface formed on the concave surface 16B in the lens optical region 11 of the far and near contact lens 10 is formed so as to have different curvature radius of two orthogonal axes corresponding to the shape of the cornea 2 in the astigmatic state.

In the far and near contact lens 10 according to the embodiment 3, the power distribution according to the formula (1) is set along the direction of the vertical axis N of the lens optical region 11 in the convex surface 16A of the lens optical region 11, and the concave surface 16B is formed to be the toric surface having the astigmatism correcting function. The toric surface can therefore perform the astigmatism correcting function, irrespective of the power distribution according to the formula (1). Therefore, the toric surface of the concave surface 16B can exhibit the astigmatism correcting function to almost all astigmatism such as inverted astigmatism, straight astigmatism, and oblique astigmatism.

In the far and near contact lens 10 according to the embodiment 3, since the concave surface 16B is a toric surface formed according to the shape of the cornea 1 in the astigmatic state, the astigmatism correcting function can be exhibited by fitting this concave surface 16B on the cornea 2 of the eye 1 of the lens wearer, and the rotation preventing function of this far and near contact lens 10 can also be exhibited. In addition, when the rotation preventing mechanism such as the prism ballast 17 or the slab-off parts 41 and 42 is provided on the end part side along the direction of the vertical axis N of the lens optical region 11 in the far and near contact lens 10, prevention of the rotation of this far and near contact lens 10 can be further effectively realized, by a synergetic effect of the rotation preventing mechanism of the prism ballast 17 or the slab-off 41 and 42, and the rotation preventing function by the aforementioned toric surface.

The present invention has been described above based on the embodiments, but the present invention is not limited thereto. For example, the aforementioned first embodiment and both modified examples, the second embodiment and the third embodiment describe a case that the ocular lens is the contact lens. However, the present invention may provide a spectacle lens implanted into the eye, or the spectacle lens of a spectacle which is worn with spacing from the cornea 2.

KEY 1 eye
2 cornea
3 pupil
10 far and near contact lens
11 lens optical region
12 distance portion
13 near portion
14 intermediate portion
17 prism ballast
30 far and near contact lens
N vertical axis (prescribed direction)
A upper end point (one end)
B lower end point (other end)
K tilted axis (prescribed direction)

The invention claimed is:

1. A progressive multifocal contact lens having a distance portion for aiding a far vision, a near portion for aiding a near vision, and an intermediate portion in which a power is changed progressively between the distance portion and the near portion, in a lens optical region, so that said distance portion, said intermediate portion, and said near portion are arranged sequentially from one end to another end along a prescribed direction of said lens optical region;

a power distribution of said lens optical region along said prescribed direction is set according to the following formula (1); and said prescribed direction is a vertical direction of an eye during wearing the progressive multifocal contact lens:

[Formula 1]

$$PowerDist = P\text{-Power} + \left(\frac{Max\text{-}Add}{\pi}\right)\left\{\tan^{-1}\left(\frac{Wave}{Bnf}X - Wave\right) + \tan^{-1}(Wave)\right\} \quad (1)$$

wherein each symbol in the formula (1) is defined as follows:

PowerDist: power distribution (unit: D (diopter));
P-Power: power (unit: D) at one end point of the lens optical region;
Max-Add: power difference (unit: D) between one end point and the other end point of the lens optical region;
Bnf: distance (unit: mm) from one end point of the lens optical region to a boundary between a distance power of the distance portion and a near power of the near portion;
Wave: power variation coefficient (wave degree); and
x: distance (unit: mm) from one end point of the lens optical region; wherein
$-25D \leq P\text{-Power} \leq +25D$;
$\pm 0D \leq Max\text{-}Add \leq +8D$;
$0.5 \text{ mm} \leq Bnf \leq 7 \text{ mm}$; and
$1 \leq Wave \leq 8$.

2. The progressive multifocal contact lens according to claim 1, further comprising a rotation preventing mechanism of preventing a rotation of this lens, at an end part along the prescribed direction, said rotation preventing mechanism being a prism ballast provided at the other end side along the prescribed direction of the progressive multifocal contact lens.

3. The progressive multifocal contact lens according to claim 2, wherein the power distribution according to the formula (1) is set along the prescribed direction of the lens optical region in one of the front surface and the back surface of said lens optical region, and the other of said from surface and back surface is formed to be a toric surface having an astigmatism correction function.

4. The progressive multifocal contact lens according to claim 1, wherein the power distribution according to the formula (1) is set along the prescribed direction of the lens optical region in one of the front surface and the back surface of said lens optical region, and the other of said front surface and back surface is formed to be a toric surface having an astigmatism correcting function.

5. A progressive multifocal contact lens having a distance portion for aiding a far vision, a near portion for aiding a near vision, and an intermediate portion in which a power is changed progressively between the distance portion and the near portion, in a lens optical region, so that said distance portion, said intermediate portion, and said near portion are arranged sequentially from one end to another end along a predescribed direction of said lens optical region;

a power distribution of said lens optical region along said prescribed direction is set according to the following formula (1); and said prescribed direction is set so as to tilt toward a nose side of a face from the vertical direction of the eye during wearing the progressive multifocal contact lens:

[Formula 1]

$$PowerDist = P\text{-Power} + \left(\frac{Max\text{-}Add}{\pi}\right)\left\{\tan^{-1}\left(\frac{Wave}{Bnf}X - Wave\right) + \tan^{-1}(Wave)\right\} \quad (1)$$

wherein each symbol in the formula (1) is defined as follows:

PowerDist: power distribution (unit: D (diopter));
P-Power: power (unit: D) at one end point of the lens optical region;
Max-Add: power difference (unit: D) between one end point and the other end point of the lens optical region;
Bnf: distance (unit: mm) from one end point of the lens optical region to a boundary between a distance power of the distance portion and a near power of the near portion;
Wave: power variation coefficient (wave degree); and
x: distance (unit: mm) from one end point of the lens optical region; wherein
$-25D \leq P\text{-Power} \leq +25D$;
$\pm 0D \leq Max\text{-}Add \leq +8D$;
$0.5 \text{ mm} \leq Bnf \leq 7 \text{ mm}$; and
$1 \leq Wave \leq 8$.

6. The progressive multifocal contact lens according to claim 5, further comprising a rotation preventing mechanism of preventing a rotation of this lens, at an end part along the prescribed direction, said rotation preventing mechanism being a prism ballast provided at the other end side along the predescribed direction of the progressive multifocal contact lens.

7. The progressive multifocal contact lens according to claim 5 wherein the power distribution according to the formula (1) is set along the prescribed direction of the lens optical region in one of the front surface and the back surface of said lens optical region, and the other of said front surface and back surface is formed to be a toric surface having an astigmatism correcting function.

8. The progressive multifocal contact lens according to claim 6, wherein the power distribution according to the formula (1) is set along the prescribed direction of the lens optical region in one of the front surface and the back surface of said lens optical region, and the other of said front surface and back surface is formed to be a toric surface having an astigmatism correcting function.

\* \* \* \* \*